(12) United States Patent
Miskevich

(10) Patent No.: US 8,475,900 B2
(45) Date of Patent: Jul. 2, 2013

(54) CONTAINER PREPARED FROM PCR HDPE RESIN BLEND

(75) Inventor: Robert Daniel Miskevich, Bangor, PA (US)

(73) Assignee: Albea Services, Gennevilliers (FR)

( * ) Notice: Subject to any disclaimer, the term of this patent is extended or adjusted under 35 U.S.C. 154(b) by 0 days.

(21) Appl. No.: 13/504,257

(22) PCT Filed: Oct. 29, 2010

(86) PCT No.: PCT/EP2010/066516
§ 371 (c)(1),
(2), (4) Date: Jul. 5, 2012

(87) PCT Pub. No.: WO2011/051472
PCT Pub. Date: May 5, 2011

(65) Prior Publication Data
US 2012/0270000 A1    Oct. 25, 2012

Related U.S. Application Data

(60) Provisional application No. 61/256,407, filed on Oct. 30, 2009.

(51) Int. Cl.
*B29D 22/00* (2006.01)
*B29D 23/00* (2006.01)
*B32B 1/08* (2006.01)

(52) U.S. Cl.
USPC ...... 428/36.92; 428/35.7; 428/36.9; 428/516; 264/464; 264/36.15; 525/240; 525/55

(58) Field of Classification Search
USPC ............. 428/35.7, 36.92, 36.9, 516; 525/240, 525/55; 264/464, 36.15
See application file for complete search history.

(56) References Cited

U.S. PATENT DOCUMENTS

| | | |
|---|---|---|
| 5,589,128 A | 12/1996 | Lai et al. |
| 5,783,637 A | 7/1998 | Herman et al. |
| 5,804,660 A | 9/1998 | Whetten et al. |
| 2006/0040121 A1 | 2/2006 | Poloso et al. |

FOREIGN PATENT DOCUMENTS

WO     03000790 A1     1/2003

OTHER PUBLICATIONS

International Search Report, PCT/EP2010/066516, mailed Feb. 21, 2011.

*Primary Examiner* — Michael C Miggins
(74) *Attorney, Agent, or Firm* — Banner & Witcoff, Ltd.

(57) ABSTRACT

The invention relates to a container prepared from a PCR HDPE blend comprising PCR HDPE and an effective amount of an impact modifier to provide acceptable ESCR results.

12 Claims, 1 Drawing Sheet

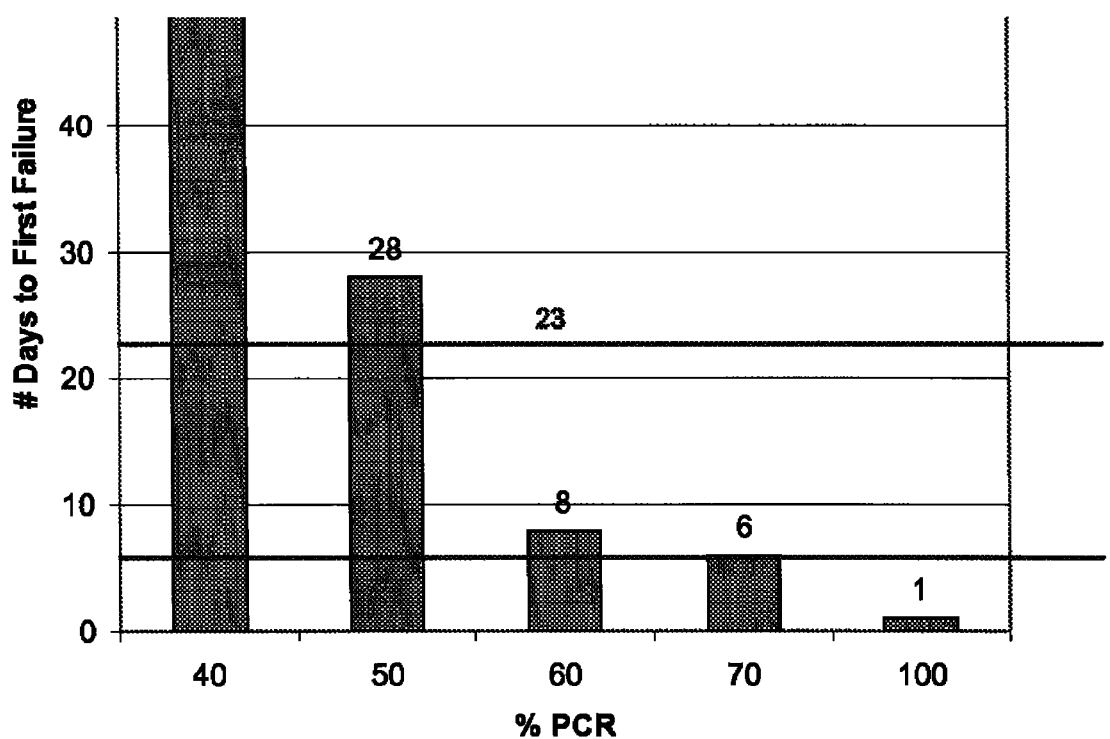

CONTAINER PREPARED FROM PCR HDPE RESIN BLEND

FIELD OF THE INVENTION

The invention relates to a container prepared from a PCR HDPE resin blend having improved environmental stress crack resistance (ESCR) and a method of making a container with the PCR HDPE resin blend.

BACKGROUND OF THE INVENTION

With the increased awareness of environmental issues such as global warming it is very desirable to be able to recycle plastic materials, in particular those used in packaging. One such source of plastic materials is known as Post Consumer Recycled (PCR). In general, 3 types of polymer are available as PCR, these being polyethylene terephthalate (PET), polypropylene (PP) and polyethylene (PE). The quality of these materials has made significant progress and PET, the most commonly used in packaging, has reached the status of food grade quality and is often recycled into bottles. PE and PP have not known the same level of development and only more recently have started to find applications into packaging. Hence, simply melting and reforming PP or PE from a PCR source often results in compromised properties and defective products. Specifically, reusing high density polyethylene container scrap (HDPE) in anything other than very low quantities provides containers having diminished physical properties, in particular diminished resistance to stress cracking.

Stress cracking is a phenomenon known to packaging such as containers and can be evidenced by the appearance of hazy cracks in the container which can be, at a minimum, unappealing to the consumer or at their worst result in leakage from the container.

Stress cracking is a property associated with long-term behavior: when the material under stress is immersed into a surfactant liquid, a crack will appear after a certain time. This phenomenon, which is very important in the case of polyethylene, is highly dependent on the surface tension exerted by the medium and the morphology of the polymer. It is known that the crack occurs sooner when the stress is higher and the material (polyethylene in this case) has a high melt index.

To avoid stress cracking, the materials used to make the container are carefully selected, with experience showing that in the field of PE materials lower density grades perform better that high density grades. For this reason accelerated testing methods have been developed over the years to allow packaging engineers to evaluate the long term risk of stress crack appearance.

A growing source of PCR material that could potentially be used to make containers comes from bottles used initially for storing milk and juices. However, this material is traditionally a HDPE grade of higher density than that conventionally used for some containers, such as tubes for instance. PCR containers made with a high PCR HDPE content hence have a higher density than containers made with virgin HDPE for these applications. It is believed that this higher density contributes to the observed poor Environmental Stress Crack Resistance (ESCR) results. Thus, very few applications involving containers for consumer products (such as filled tubes) use significant quantities of PCR HDPE.

Despite these inherent difficulties, the growing quantities of post consumer HDPE, the increased level of colour sorting and decontamination (with the arrival of food grade quality), it is very desirable to use such PCR HDPE. The preferred process to make such tubes would be to simply replace all or some of the virgin HDPE by quantities of PCR HDPE and extrude the material as a monolayer blend. However, such monolayer extruded blends of PCR HDPE do not have adequate ESCR properties for market use. ESCR properties are evaluated using accelerated testing protocols and can be defined as the number of days elapsed before observing the first failure of a container or a batch of containers subjected to ESCR test conditions. For the field of the present invention, adequate ESCR properties refer to at least 6 days elapsed before a first failure of a container during an ESCR test.

One prior art solution co-extrudes the PCR HDPE with one or more other resins so that the PCR layer is an external (surface) layer of a container (hence isolated from the inner layer in contact with liquids) or the PCR HDPE is encapsulated between virgin layers. However, co-extrusion is expensive, and thus it is desired to avoid coextrusion.

Another solution is offered by U.S. Pat. No. 5,783,637 wherein PCR HDPE is fusion blended with virgin HDPE and LLDPE to reduce or eliminate the ESCR problem. Fusion blending or compounding is an extra step in which the PCR HDPE and a modifier are mixed/compounded together in a different extruder, prior to the actual extrusion step to form the container, in order to form pellets; these pellets are then fed into the extruder and mixed with the virgin HDPE. This additional fusion blending operation would be expected to improve the mixing of the two materials to form a more homogenous blend, and hence improve the ESCR performance. However, this extra step requires additional cost and preparation time.

However, even when incorporated as a blend with virgin polyethylene (PE) resins, the higher the HDPE PCR content, the worse the ESCR properties of the blended resins. That is, ESCR properties are reduced with increased PCR HDPE content in blends, especially when greater than 50% PCR HDPE is desired, to achieve maximal recycled content. In the solution described in U.S. Pat. No. 5,783,637 the number of days elapsed to the first failure is always smaller than 6, for blends including a PCR content of at least 50%.

A solution is desired which allows an increased percentage of PCR HDPE to be used, having adequate ESCR properties, without requiring the use of virgin HDPE.

SUMMARY OF THE INVENTION

In one aspect, the present invention is directed to a container prepared from a PCR HDPE blend comprising PCR HDPE and an effective amount of an impact modifier to provide acceptable ESCR results.

In particular, the invention is directed to a high-content PCR HDPE container comprising:
  40 wt % to 70 wt % by weight PCR HDPE based on total weight of the blend: and
  30 wt % to 60 wt % by weight of an impact modifier based on total weight of the blend;
  wherein the PCR HDPE has a density of 0.95-0.97 g/cm3 and melt flow index of about 1.5 or less;
  wherein the impact modifier comprises at least one of:
  ULDPE having a density of 0.89-0.92 g/cm$^3$ and a melt flow index of about 1.5 or less, and
  an elastomer having a density of 0.87 to 0.91 g/cm$^3$ and a melt flow index of about 1.5 or less; and
  wherein the container has a density of 0.90-0.95 g/cm3.
The container can have the following features:
  the container comprises about 40 wt % to about 60 wt % by weight of the impact modifier, the container comprises about 40 wt % to about 60 wt % by weight of the PCR HDPE, the PCR HDPE has a melt flow index of about 1 or less, the impact modifier has a melt flow index of about 1 or less, the container comprises a tube, the tube has a sleeve thickness of 400 μm or less and a diameter of at least 30 mm, the tube has a sleeve thickness of 350 μm or less and a maximum diameter of 30 mm, the container comprises a mascara container, the PCR HDPE is food-grade FDA LNO, the container is able to withstand an accelerated ESCR test for at least 6 days.

In other aspects the present invention is directed to methods for producing containers with the PCR HDPE blends by extrusion or injection-blow-molding.

In particular, the invention is directed to a method of making a high-content PCR HDPE container comprising extruding or molding a composition comprising, 40 wt % to 70 wt % by weight PCR HDPE based on total weight of the blend: and 30 wt % to 60 wt % by weight of an impact modifier based on total weight of the blend;

wherein the PCR HDPE has a density of 0.95-0.97 g/cm3 and melt flow index of about 1.5 or less;

wherein the impact modifier comprises at least one of:

ULDPE having a density of 0.89-0.92 g/cm3 and a melt flow index of about 1.5 or less, and an elastomer having a density of 0.87 to 0.91 g/cm3 and a melt flow index of about 1.5 or less; and wherein the container has a density of 0.90-0.95 g/cm3.

BRIEF DESCRIPTION OF THE DRAWINGS

FIG. 1 shows number of days to first failure based on % PCR HDPE.

DETAILED DESCRIPTION OF THE INVENTION

The present invention is directed to a container prepared from a PCR HDPE blend having an improved ESCR over containers prepared from 100% PCR HDPE. The PCR HDPE blend combines the PCR HDPE with an impact modifier. The impact modifier, when added to PCR HDPE, reduces the final density of the blend and improves ESCR in containers compared to containers made with 100% PCR HDPE.

The PCR HDPE blend comprises a minimum of 40 wt % PCR HDPE, for example 40 wt % to 70 wt %, or 40 wt % to 60 wt %, and between 30 wt % and 60 wt %, for example, 40 wt % to 60 wt %, of an impact modifier based on total weight of the PCR HDPE blend. The impact modifier is present in an amount effective to provide the desired ESCR characteristics. Both the PCR HDPE blend and the impact modifier may be used in any suitable form such as flakes or pellets.

PCR HDPE can come from a variety of sources but primarily comes from containers used for packaging milk. Typically, PCR HDPE has a density of 0.95-0.97 g/cm$^3$. For example, trial data obtained with PCR HDPE had a density between 0.958 and 0.965 g/cm$^3$. It is desired that the PCR HDPE is food-grade US FDA "Letter of No Objection" (LNO) quality (or European equivalent) so that the PCR HDPE blend may be used for containers in applications where food contact is necessary or preferable, such as in the cosmetics field, for example. Generally less than 3 wt % of polypropylene may be present in the PCR HDPE such as found in syrup bottles and ketchup bottles.

The impact modifier enhances environmental stress crack resistance (ESCR) of the PCR HDPE. Suitable impact modifiers include ultra low-density ethylene polymers (ULDPE), elastomers, and blends thereof.

The ULDPE has a density of at most 0.92 g/cm$^3$, typically between 0.89 and 0.92 g/cm$^3$. Suitable ULDPE polymers are commercially available such as Dow's Attane™ ULDPE. The ULDPE employed in the present invention have long linear chains with controlled numbers of relatively short chain branches attached to the linear chain along its entire length. These side chains or "branches" are short and will contain from about 1 to 10 carbon atoms depending upon the particular aiphamonoolefin employed in the preparation of the polymer. ULDPE may be prepared with single site metallocene-type catalysts utilizing a solution polymerization process.

The linear low-density ethylene polymers (including ULDPE) differ structurally from low-density ethylene polymers (LDPE) made by high-pressure free radical initiated polymerizations in having few, if any, long chain branches. LDPE has a branching structure that will not provide good ESCR results. The impact modifier ULDPE reduces the final product density and improves ESCR properties.

An even lower density polyolefin, such as an elastomer with a density in the range of 0.87 to 0.91 g/cm$^3$ is expected to provide even better ESCR results. Elastomers such as the ENGAGE™ polyolefin provided by Dow are suitable.

The Melt Flow Index (MFI) of the PCR HDPE is less than 1.5, for instance about 1 or less, @ 190 C using 2.16 kg weight for 10 minutes (ASTM D1238). The MFI of the impact modifier is less than 1.5, for instance about 1.0 or less, @ 190 C using 2.16 kg weight for 10 minutes.

In the present invention the respective PCR HDPE blend may be used as a monolayer (single layer) structure (i.e. not co-extruded) in container walls such as for tubes. Such containers may be made by molding or by extrusion. For example, a monolayer extruded tube produced from the PCR HDPE blend provides efficiency and cost advantages over a multilayer (coextruded) tube wall, which either confines PCR HDPE material in an encapsulated center or an outer layer.

In accordance with the present invention, PCR HDPE blend containers may be made by extrusion or molding such as by injection-blow-molding. For example, tubes are typically prepared by extrusion and mascara containers are typically prepared by extrusion or injection-blow-molding.

Typical state-of-the-art tube manufacturing processes by extrusion are carried out at approximately 250-260° C. Material is fed into an extruder having a tubular/annular die, and the molten material is extruded and exits the extruder as a tube. This tube is passed through a calibrator which uses a water spray and vacuum system to cool the tube into a calibrated tube of controlled dimensions. A puller-cutter unit is then used to pull out the formed tube as it is formed, and cut the tube to the desired length.

Typical injection-blow-molding utilizes a set of molding and blowing units. In a first step, material is injected into a mold unit to form a pre-form The pre-form is transferred to a blowing unit where it may be re-heated and then blown (using compressed gas) into the shape of a second mold. Similar containers can be obtained by extruding material into a first mold to form the pre-form and then blowing in the same manner to obtain the final shape.

The PCR HDPE blend may be made by fusion blending the PCR HDPE and impact modifier prior to extrusion or blow-molding. In fusion blending, more than one polymer is blended under a molten state to achieve properties that may not be available in the individual polymers. The quality of the polymer blending is characterized by the degree of dispersion of a minor phase polymer into a major phase polymer.

The container prepared with the PCR HDPE blend may be any suitable container such as a tube. It has even been seen to be possible using this invention to produce tubes having sleeve thicknesses lower than those conventionally used on the market. This provides an additional advantage when viewed in the perspective of reducing the environmental impact of packaging. For instance, the tube may have a sleeve thickness of as low as 400 μm for tubes of diameter of 30 mm or above, or a sleeve thickness of as low as 350 μm or less for diameters of up to 30 mm.

The container will generally have a density of 0.90-0.95 g/cm$^3$. Other suitable ingredients may be blended into the PCR HDPE blend such as colorants and surface decorations as is standard.

The impact modifier useful in the PCR HDPE blend enhances environmental stress crack resistance (ESCR) of the PCR HDPE to the point that the containers can pass the ESCR tests even when produced in a mono layer. This has even greater significance when it is considered that the impact modifier further allows the newly available food grade PCR HDPE materials to be blended into a monolayer extrusion at PCR HDPE loading levels above 30% and still meet the market performance standards of individual virgin PE resins. This allows them to be considered for stringent applications such as cosmetic or food packaging where it is desirable to use a simpler mono layer product and where direct contact between the container material and the content is a necessity. Thus, a container made with the PCR HDPE blend is improved over a container made from 100% PCR HDPE.

Ideally, after accelerated testing, the impact modifier provides the desired ESCR of about 23 days. However, acceptable ESCR performance may be as low as 6 days. Below 6 days, the resistance of the container is uncertain and often depends on the aggressivity of the product to be filled into the container. In the present invention, improved ESCR characteristic refers to the plastic container being able to withstand an accelerated ESCR test for at least 6 days, preferably at least 8 days, and more preferably at least 23 days. It was discovered that containers having a PCR HDPE % as high as 70% had a 6-day to failure ESCR characteristic, and were thus suitable containers. Stress crack resistance may be tested with test methods established by ASTM D2561-95, a standard test method for environmental stress-crack resistance of blow-molded polyurethane containers.

EXAMPLES

ESCR was tested by filling containers, sleeves, or tube bodies with an aggressive product (Igepal) and measuring the number of days before a container "failed." The results are shown in FIG. 1 which is a graph of the PCR % vs. the number of days until the first failure was observed.

An accelerated test was used to evaluate the stress crack resistance of plastic tube containers. A failure is defined as a stress crack or a fracture through the polymer wall above the endseal for plastic tubes.

The following testing procedure was used:

1. Sample size of 5 or 10 tubes per test (recommended) are filled with 10% Igepal (polyoxyethylated nonylphenol), CO630/Distilled Water Solution.
2. Fill sleeves to 5% of their recommended fill volume
3. Heat seal in laboratory end seal unit
4. Place sleeve end seal down in rack and place in oven at 40° C. temperature.
5. Control tubes daily—visual inspection for leaks, either "as is" or after applying pressure with hand squeeze.
6. Record the number of days to first tube failure.

The following monolayer blends were each prepared and formed into five natural (clear or additive-free) sleeves. The PCR is PCR HDPE and the modifiers were obtained from Dow. Testing was performed in accordance to the process above.

| MONOLAYER BLEND SLEEVES/MODIFIERS | | | | | | | | |
|---|---|---|---|---|---|---|---|---|
| | | NATURAL SLEEVES | | | FAILURE | IGEPAL - 105 F. (40 C.) DAYS TO FAILURE (to 48 days) | | |
| # | % PCR | % Modifier | Modifier# | Modifier | TOTAL | first | 3 of 5 | 5 of 5 |
| 1 | 70 | 30 | 8150 | elastomer | 5 | 6 | 6 | 6 |
| 2 | 60 | 40 | 4201G | ULDPE | 5 | 8 | 8 | 14 |
| 3 | 50 | 50 | 4201G | ULDPE | 1 | 28 | >48 | >48 |
| 4 | 40 | 60 | 4201G | ULDPE | 0 | >48 | >48 | >48 |
| 5 | 60 | 40 | 4203 | ULDPE | 5 | 11 | 17 | 17 |
| 6 | 50 | 50 | 4203 | ULDPE | 0 | >48 | >48 | >48 |
| 7 | 40 | 60 | 4203 | ULDPE | 0 | >48 | >48 | >48 |
| 8 | 0 | 0 | 4750 | HDPE | 5 | 23 | 23 | 23 |

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A high-content PCR HDPE container comprising:
   40 wt % to 70 wt % by weight PCR HDPE based on total weight of the blend: and
   30 wt % to 60 wt % by weight of an impact modifier based on total weight of the blend;
   wherein the PCR HDPE has a density of 0.95-0.97 g/cm3 and melt flow index of about 1.5 or less;
   wherein the impact modifier comprises at least one of:
   ULDPE having a density of 0.89-0.92 g/cm3 and a melt flow index of about 1.5 or less, and
   an elastomer having a density of 0.87 to 0.91 g/cm3 and a melt flow index of about 1.5 or less; and
   wherein the container has a density of 0.90-0.95 g/cm3.
2. The container of claim 1, comprising about 40 wt % to about 60 wt % by weight of the impact modifier.

3. The container of claim 1, comprising about 40 wt % to about 60 wt % by weight of the PCR HDPE.

4. The container of claim 1, wherein the PCR HDPE has a melt flow index of about 1 or less.

5. The container of claim 1, wherein the impact modifier has a melt flow index of about 1 or less.

6. The container of claim 1, comprising a mascara container.

7. The container of claim 1, wherein the PCR HDPE is food-grade FDA LNO.

8. The container of claim 1, wherein the container is able to withstand an accelerated ESCR test for at least 6 days.

9. The container of claim 1, wherein the container comprises a tube.

10. The container of claim 9, wherein the tube has a sleeve thickness of 400 μm or less and a diameter of at least 30 mm.

11. The container of claim 9, wherein the tube has a sleeve thickness of 350 μm or less and a maximum diameter of 30 mm.

12. A method of making a high-content PCR HDPE container comprising extruding or molding a composition comprising, 40 wt % to 70 wt % by weight PCR HDPE based on total weight of the blend: and 30 wt % to 60 wt % by weight of an impact modifier based on total weight of the blend;

wherein the PCR HDPE has a density of 0.95-0.97 g/cm3 and melt flow index of about 1.5 or less;

wherein the impact modifier comprises at least one of:

ULDPE having a density of 0.89-0.92 g/cm3 and a melt flow index of about 1.5 or less, and an elastomer having a density of 0.87 to 0.91 g/cm3 and a melt flow index of about 1.5 or less; and wherein the container has a density of 0.90-0.95 g/cm3.

* * * * *